United States Patent
Besore et al.

(10) Patent No.: US 9,213,998 B2
(45) Date of Patent: Dec. 15, 2015

(54) MONITORING HOT WATER USAGE IN A GAS WATER HEATER

(75) Inventors: John K. Besore, Prospect, KY (US); Chelsea Rose Miko, Louisville, KY (US); Brian Michael Schork, Louisville, KY (US)

(73) Assignee: General Electric Company, Schenectady, NY (US)

( * ) Notice: Subject to any disclaimer, the term of this patent is extended or adjusted under 35 U.S.C. 154(b) by 881 days.

(21) Appl. No.: 13/358,707

(22) Filed: Jan. 26, 2012

(65) Prior Publication Data

US 2013/0197827 A1 Aug. 1, 2013

(51) Int. Cl.
G05D 23/19 (2006.01)
F24D 19/10 (2006.01)
G06Q 50/06 (2012.01)
G01K 17/08 (2006.01)

(52) U.S. Cl.
CPC .............. *G06Q 50/06* (2013.01); *G01K 17/08* (2013.01); *G05D 23/1905* (2013.01); *G05D 23/1931* (2013.01); *F24D 19/1063* (2013.01)

(58) Field of Classification Search
CPC . F24D 19/1054; F24D 19/1063; G06Q 50/06; G05D 23/1931; G05D 23/1905; G01K 17/08
USPC .......................................................... 702/45
See application file for complete search history.

(56) References Cited

U.S. PATENT DOCUMENTS

| | | | |
|---|---|---|---|
| 4,575,801 A | 3/1986 | Hoberman et al. | |
| 4,804,957 A | 2/1989 | Selph et al. | |
| 4,924,404 A | 5/1990 | Reinke, Jr. | |
| 5,153,837 A | 10/1992 | Shaffer et al. | |
| 5,572,438 A | 11/1996 | Ehlers et al. | |
| 5,696,695 A | 12/1997 | Ehlers et al. | |
| 2012/0052453 A1* | 3/2012 | Besore | F24H 1/124 431/14 |
| 2013/0110413 A1 | 5/2013 | Schork et al. | |

OTHER PUBLICATIONS

Hartman et al., "Using a Condition Monitoring System to Detect Boiler Steam Leaks", 2009, ISA POWID EPRI Conference May 2009.*
Capehart et al., "Guide to Energy Management", Chapter 8 "Steam Generation and Distribution", 2003, Fairmont Press 4th Edition.*
Earle et al., "Unit Operations in Food Processing", 1983, Chapter 2, Published by NZIFST*
Standard DIN V 18599-1, "Energy efficiency of buildings—Calculation of the energy needs, delivered energy and primary energy for heating, cooling, ventilation, domestic hot water and lighting—Part 1: General balancing procedures, terms and definitions, zoning and evaluation of energy carriers", Feb. 2007.*
R. Shanthini, "Thermodynamics for Beginners", 2009, Chapter 10, by Science Education Unit, University of Peradeniya, Sri Lanka, pp. 211-248.*

* cited by examiner

*Primary Examiner* — Regis Betsch

(74) *Attorney, Agent, or Firm* — Dority & Manning, P.A.

(57) ABSTRACT

An apparatus and method for determining the volume of hot water dispensed during a given timeframe from a hydrocarbon fueled water heater based on the volume of fuel consumed by the water heater during the timeframe and the average temperature difference between the inlet water temperature and the outlet water temperature during the timeframe.

12 Claims, 10 Drawing Sheets

MONITORING HOT WATER USAGE IN A GAS WATER HEATER

BACKGROUND OF THE INVENTION

The subject matter disclosed herein relates generally to energy management of hydrocarbon fueled residential hot water heaters, and more particularly to monitoring household usage of hot water heated by such water heaters.

Basic hot water heaters generally include a hot water reservoir, such as a thermally insulated hot water tank, a heating element such as a gas burner, and a thermostat that controls the burner to maintain a set temperature of the water in the reservoir. In general, the temperature of the water is maintained at a relatively constant level corresponding to a set point of the thermostat, for example 140 degrees Fahrenheit (F.), until it is needed. As hot water is dispensed from the reservoir, cold water is admitted thereby lowering the bulk temperature of the water. The temperature of the water in the reservoir may also be lowered as a result of heat loss through the walls of the reservoir. When the water temperature drops below the set point of the thermostat, the heating element is activated to restore the temperature of the water to the setpoint temperature.

The advent of home energy management (HEM) systems has created an increasing homeowner interest in total energy consumption in the home. A large portion of residential natural gas usage is to heat water in addition to heating the residence. Being able to accurately ascertain how much hot water is being consumed over a specific timeframe along with the associated cost would be advantageous for a home energy management system, especially when coupled with the ability to determine the amount of this usage without having to hire a plumber to install (or manually install) a hot water flowmeter.

BRIEF DESCRIPTION OF THE INVENTION

As described herein, the exemplary embodiments of the present invention overcome one or more disadvantages known in the art.

One aspect of the present invention relates to a method for determining the amount of hot water drawn from a water heater during a predetermined time/frame, e.g., a 24 hour period, comprising the steps of measuring temperature of input water to the hot water heater during the given timeframe at a predetermined frequency or sampling rate, measuring temperature of output water from the hot water heater during the given timeframe at the predetermined frequency or sampling rate, calculating water heater heat leakage during the given timeframe based on the water temperature measurements and multiple parameters of the hot water heater, calculating an amount of gas used to maintain the hot water heater at a (user selected temperature) set-point based on the calculated water heater heat leakage rate, calculating the amount of gas used to heat the water, that is, the amount of gas used to restore the water in the heater to the setpoint temperature following water dispensing events during the given timeframe by subtracting the amount of gas used to maintain the hot water heater at a set-point from a total gas consumption measurement, calculating volume of water heated, which corresponds to the amount of water dispensed, during the given timeframe based on the water temperature measurements and the amount of gas used to heat the water during the given time frame.

Yet another aspect relates to a hydrocarbon-fueled hot water heater for supplying hot water that includes a water reservoir, a cold water inlet for supplying water to the reservoir, a hot water outlet for dispensing water from the reservoir, a selectively activated fixed-orifice burner for applying heat to the water in the reservoir, temperature sensors for sensing the inlet and outlet pipe temperatures, a processor for processing the sensed temperature data to calculate water usage data for the hydrocarbon-fueled hot water heater, and a communication interface for communicating water usage data to the user.

These and other aspects and advantages of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and, unless otherwise indicated, they are merely intended to conceptually illustrate the structures and procedures described herein.

DETAILED DESCRIPTION OF THE EXEMPLARY EMBODIMENTS OF THE INVENTION

As described herein, one or more embodiments of the invention include techniques and apparatuses for monitoring hot water usage in a gas water heater without needing a water flow meter to be installed in the inlet or outlet piping of the water heater. An aspect of the invention includes a methodology for monitoring the consumption of hot water from a hydrocarbon-fueled (for example, natural gas) water heater incorporating a fixed flow one-stage burner without having to place an invasive water flow meter in the water supply line or discharge line of the water heater.

Figure 1:
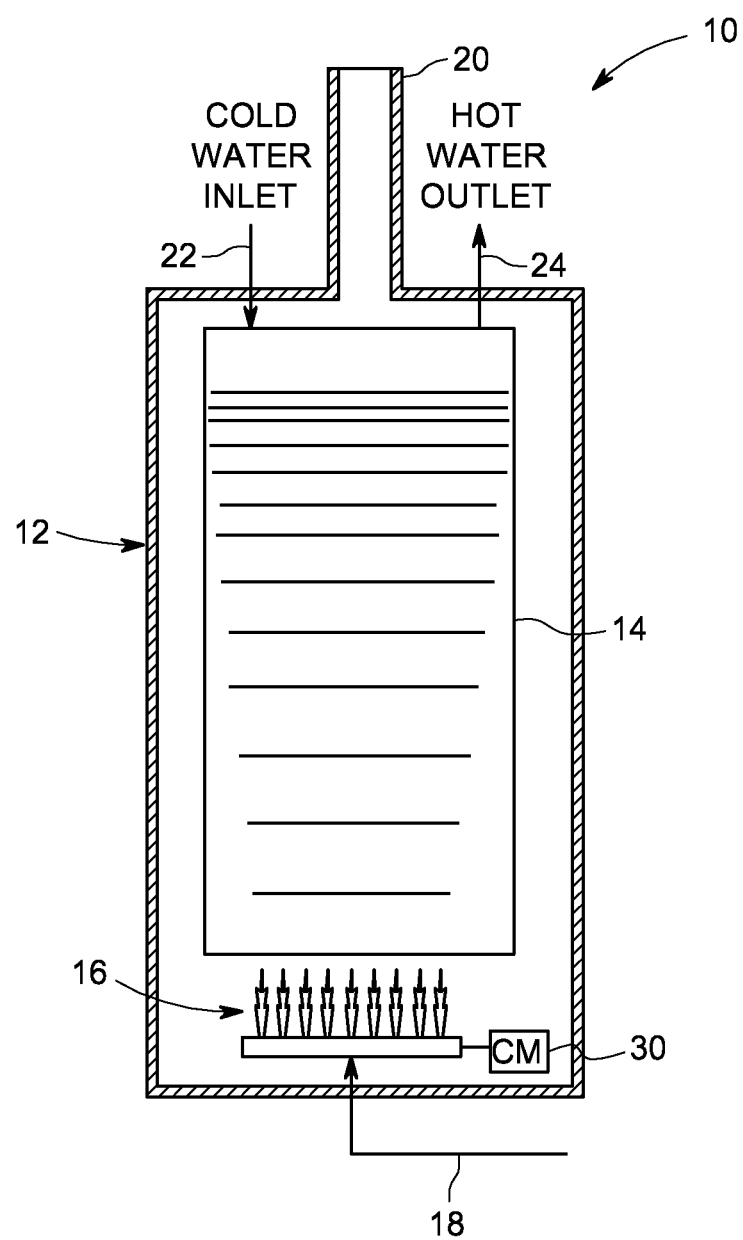
FIG. 1 presents a schematic diagram of an exemplary conventional hydrocarbon-fueled hot water heater.

Turning now to the drawings, FIG. 1 illustrates a conventional hydrocarbon-fueled hot water heater 10 including a housing 12 in which a reservoir or tank 14 and a heat source in the form of a burner 16, are supported. The burner 16 burns fuel from a fuel source 18, typically natural gas or propane, to generate heat to heat the water in the tank 14. Hot combustion gases created by the burner flow from a vent stack 20 to an exterior of the unit. Cold water is admitted to the reservoir 14 via cold water inlet 22. Hot water is dispensed via a hot water outlet 24 for distribution to one or more hot water taps.

As will be appreciated, a conventional hydrocarbon fueled hot water heater, such as hot water heater 10, will further include a gas burner control module 30 for controlling the operation of the burner 16. Such a control module 30 may typically include an electronic controller, thermocouple, one or more valves, and a pilot or other ignition source for selectively activating the burner. As will be appreciated, the control module 30 operates to activate the burner 16 to apply heat to a volume of water to heat the water to a desired set point.

A hot water heater system as detailed herein can additionally include a user interface to enable the user to program the controller such as by entering a desired temperature setpoint for the hot water heater. The user interface can include one or more user inputs and a display for displaying data and/or settings to the user. Such user interface can be associated with the controller and/or water heater, or can be a separate device that is configured to communicate with the controller. For example, the user interface could be a display and keypad mounted to the hot water heater. Alternatively, the user interface could be a personal computer or a cell phone configured to communicate with the controller.

As will be hereinafter described, the amount of hot water dispensed by the hot water heater over a particular time period of interest, in the illustrative embodiments a 24 hour period, a processor is configured to process periodically sampled inlet and outlet water temperatures together with the amount of fuel consumed by the gas burner during the period to calculate the volume of hot water dispensed during the period.

Figure 2:
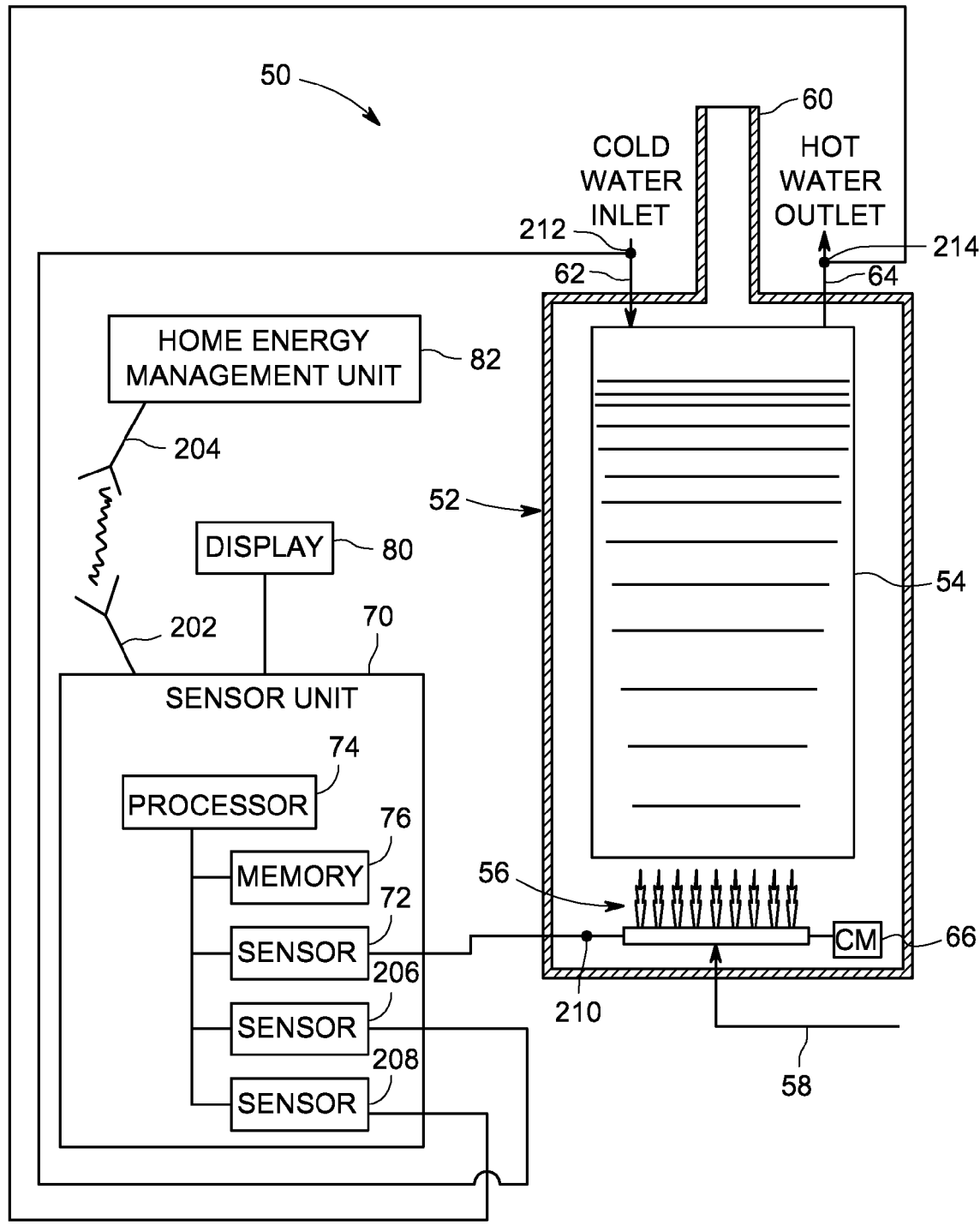
FIG. 2 presents a schematic diagram of an exemplary hydrocarbon-fueled hot water heater, in accordance with a non-limiting exemplary embodiment of the invention.
Figure 3:
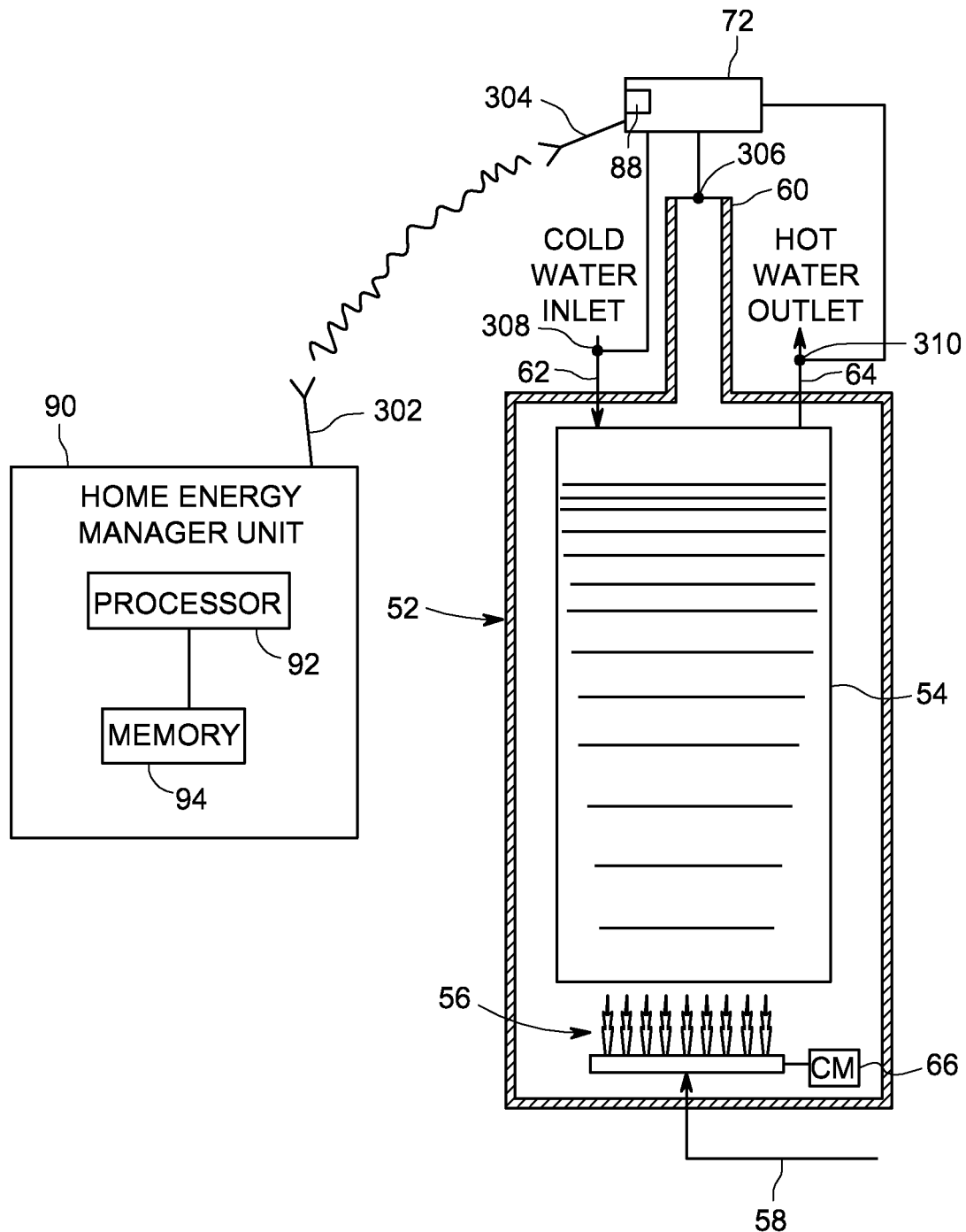
FIG. 3 presents a schematic diagram of another exemplary hydrocarbon-fueled hot water heater, in accordance with a non-limiting exemplary embodiment of the invention.

The amount of fuel consumed data needed for this calculation could be determined use of an in-line metering device. However, such devices are not typical of most residential water heater configurations. Accordingly, in the illustrative embodiments hereinafter described, the gas consumption data is acquired using a temperature sensor configured to sense the temperature of a component of the burner system and process this data to calculate the amount of gas burned during the period of interest. FIG. 2 and FIG. 3, as well as descriptions herein, set forth several devices and methods of acquiring fuel consumption data by a hydrocarbon fueled hot water heater, which are described in greater detail in commonly assigned co-pending application Ser. No. 13/283,287, filed Oct. 27, 2011, entitled Estimating Gas Usage in a Gas Burning Device. The co-pending application is incorporated herein by reference.

For hydrocarbon-fueled ("gas fired") water heaters and furnaces that do not have a throttling mechanism (that is, the burner or burners are selectively activated to be on at 100% capacity or off), which characterizes most residential gas water heaters and furnaces, one can use the "on time" of the burner, that is, the duration of time the burner is activated and the rated capacity of the burner to estimate the amount of fuel that is consumed. The assumptions made in order to implement this method include: 1) the orifices that flow gas are flowing at the rated capacity, 2) the line pressure of the gas supply is within specifications (there is typically a pressure regulator inherent to a water heater that controls the inlet pressure to the heater to 3-4 inches of water regardless of the incoming pressure to the residence), and 3) ignoring the pilot gas consumption (for those units that may have a pilot and thermocouple) does not significantly impact the estimation. Such an estimation method would take the form of: time on,t (minutes)*flow rate (cfm)=x cubic feet of gas consumed in time t.

A correction can be included that compensates for the gas consumed by the pilot light by assuming a generic flow for the pilot light which is typically fairly standard. The user could input "pilot" or "no pilot" into the HEM or sensor module. Also, an adjustment factor can be applied to modify the pilot consumption number to estimate the amount of heat from the pilot that escapes up the stack. Some of the pilot heat does add heat to the water in the tank, so the entire pilot consumption heat is not lost. But, those skilled in the art of water heater design can empirically determine this factor from testing. This factor will not vary significantly from manufacturer to manufacturer.

An estimation of gas flow during the on cycle can be derived using the burner rated capacity. More specifically: Flowrate=burner capacity (British thermal unit (BTU))/gross heat of combustion of natural gas. This equation yields the gas flow rate in cubic feet per minute (CFM). The actual gross heat of combustion for natural gas can vary geographically and over time. The actual then prevailing value for a particular region if known, could be used, however, a value of 1025 $BTU/ft^3$ has been used by the natural gas industry as a reliable average value (the value would be different for propane). This value is used in the illustrative embodiments herein described.

To optimize the accuracy, an efficiency factor that relates to the water heater efficiency could be applied to this equation. This would increase the flowrate of gas required to achieve a given capacity because some of the heat will be "wasted" due to inefficiencies.

Thus, it will now be appreciated that by measuring just the burner "on time" the gas consumption of the hot water heater can be estimated using the above-described method. As hereinafter described, detecting burner "on time" can be performed with one or more of a variety of sensors that sense heat, vibration, sound, combustion gasses, etc.

Turning to FIG. 2, an exemplary hot water heater system 50 is illustrated. The hot water heater system 50 includes a hydrocarbon-fueled hot water heater 52 having a reservoir 54 and a burner 56 for applying heat to a volume of water. The burner 56 burns fuel supplied thereto from a fuel supply 58. The burner 56 can be housed, for example, within a burner box (not pictured). A burner box can additionally include a pilot window for convenience. The hot water heater system can additionally include a rating plate (not pictured). A rating plate can include one or all of the following: the model number, brand, efficiency of the burner, as well as the rated capacity of the burner. Hot exhaust gases are discharged via the vent stack 60. Cold water is admitted to the water heater 52 via inlet 62, and hot water is discharged via hot water outlet 64. A control module 66 controls the burner. As described thus far, the hot water heater 52 is similar to the conventional hot water heater 10 of FIG. 1.

A sensor module (or unit) 70 is provided for sensing temperatures used in this embodiment for sensing activation of the burner 56 and for estimating hot water usage. The sensor module 70 can be attached to the outer shell of the heater 52 (for example, magnetically attached or attached via adhesive). In the illustrated embodiment, the sensor unit 70 includes sensors 72, 206 and 208, as well as a processor 74 and memory 76. Sensor 72 includes transducer/thermistor 210 attached adjacent or near to the burner (or burner box). Additionally, sensor 206 includes a transducer/thermistor 212 attached adjacent or near to the cold water inlet pipe and sensor 208 includes transducer/thermistor 214 attached adjacent or near to the hot water outlet pipe. Alternatively, sensors 206 and 208 for measuring the inlet and outlet water temperature could include sensor probes in direct contact with the water proximate the cold water inlet pipe and hot water outlet pipes respectively. The processor 74 is in communication with the sensors 72, 206 and 208 and a memory 76 for collecting and storing the temperature versus time data. The data is collected by periodically sampling the temperature sensors and time stamping the samples. The sampling frequency or sampling rate is a trade-off between accuracy, memory storage space and processing time. For the illustrative embodiments described herein, a sampling rate of 1 sample/15 seconds is contemplated, but other rates could be similarly employed. The processor 74 uses data collected from the burner related temperature sensor for calculating the burner on-time, which in turn is used to calculate the amount of gas used, and uses data collected from the water temperature sensors to calculate the average dispensed water temperature and average incoming water temperature during water dispense events. The amount of gas used and average temperature information is ultimately used to estimate the volume of hot water withdrawn from the hot water tank during the particular time period of interest, all as hereinafter described.

While in the illustrative embodiments sensor 72 is a temperature sensor configured to collect burner related temperature data which is used to determine burner On time, alternatively, the sensor 72 used to collect data for determining the burner on time could comprise:

- an infrared (IR) detector, heat detector, or other transducer that can detect a flame in the water heater burner area. The start and stop times of the flame can be sent to the processor for calculating the "total on time" between two points in time.
- a thermoelectric device that generates a voltage proportional to the temperature increase near the burner. By monitoring this voltage and/or sending the signal to the processor, the processor can use such information to calculate burner on time.
- an acoustic or vibration detection device in the burner area can be used to detect the presence of combustion in the burner area to identify the "on" and "off" conditions of the burner. For example, a microphone can be tuned to detect burner noise that occurs when the main burner ignites and a different unique acoustical spectrum during a continuous burn. An accelerometer can be used to detect vibrations in specific components that occur when the main burner ignites and a different unique vibration spectrum during a continuous burn.

Once the burner "on time" is determined and the amount of gas and hot water consumed is calculated, the results can be displayed to a user on a display 80. In this embodiment, the display is associated with the sensor unit 70. Both the sensor unit 70 and the display 80 can be provided integrally with the water heater 52, or as add-on components mounted thereto. Further, as additionally described herein, information from the sensor unit 70 can be relayed to a home energy manager (HEM) 82 for use in HEM algorithms. The embodiment depicted in FIG. 2 illustrates the relay of information being carried out wirelessly between antenna 202 on the sensor unit and antenna 204 on the HEM unit. A hardwire connection can also be present in one or more embodiments. Also, in some embodiments, the display 80 can be associated with the HEM thus obviating the need for a dedicated display to be provided to display the energy usage details at the hot water heater itself.

Turning to FIG. 3, another exemplary hot water heater system 52 in accordance with the present disclosure is illustrated. In this embodiment, a sensor module 72 includes a transducer 306 that is provided on or adjacent the vent stack 60 of the hot water heater 52 and is configured to detect physical and/or chemical changes that occur during activation/deactivation of the burner 56. The sensor module 72 also includes a transducer 308 attached adjacent or near to the cold water inlet pipe and a transducer 310 attached adjacent or near the hot water outlet pipe. As with the embodiment of FIG. 2, alternative sensor locations for measuring the water temperature, including but not limited to sensors in direct contact with the water could be similarly employed. In this embodiment, the sensor module 72 includes a communication interface 88 for communicating data to a home energy manager unit 90 that includes a processor 92 and memory 94 for recording and processing the temperature data collected by transducers 306, 308 and 310 to calculate gas and hot water consumption, rather than performing these functions in the sensor module as was done in the embodiment of FIG. 2. The embodiment depicted in FIG. 3 illustrates the relay of information being carried out wirelessly between antenna 302 on the HEM unit and antenna 304 on the sensor unit. A hardwire connection can also be present in one or more embodiments. As will be appreciated, alternatively, the sensor module 72 could be configured to include a processor and memory for recording and processing the temperature data as in the embodiment of FIG. 2.

In the embodiment of FIG. 3, the transducer 306, comprises a temperature measurement device (for example, a solid state device, an RTD, a thermistor or a thermocouple). The transducer 306 detects the temperature of the vent stack 60. When the burner 56 ignites or extinguishes, the temperature profile of the stack very closely tracks the "on" and "off" states of the burner. The temperature versus time data can be processed as hereinafter described with reference to FIGS. 4 and 5 to determine burner on times and calculate the gas usage in a given timeframe.

Alternatively, the following sensors could be employed proximate the vent stack in lieu of a temperature sensor to determine burner on times:

- a flow transducer within the vent stack 60 to detect the flow of expelled gases to give an indication of "burner on." The probe of such sensor would likely need to be tolerant of high temperature gases flowing. Additionally, in such an embodiment, the system would be programmed to distinguish between the flow that results from pilot light burning and the pilot light plus the main burner burning (as described herein).
- a strain gauge on the surface of the vent pipe to detect the strain rate change due to the expansion caused by the hot gases in the vent stack 60. As before, the strain gauge likely would need to be tolerant of high temperatures.
- a thermoelectric device capable of generating a voltage proportional to the temperature increase in the stack 60 due to exhaust gases flowing inside the pipe. By monitoring this voltage and sending the signal to the HEM or other processor, activation of the burner can be detected using an algorithm so tailored.
- similarly, one could employ a gas sensor, such as a carbon monoxide (CO) sensor, in the vent stack 60 to detect the presence of carbon monoxide, or any other inert gas sensor, that would be present in the exhaust gases from the combustion process to capture the on and off conditions of the burner.

Figure 4:
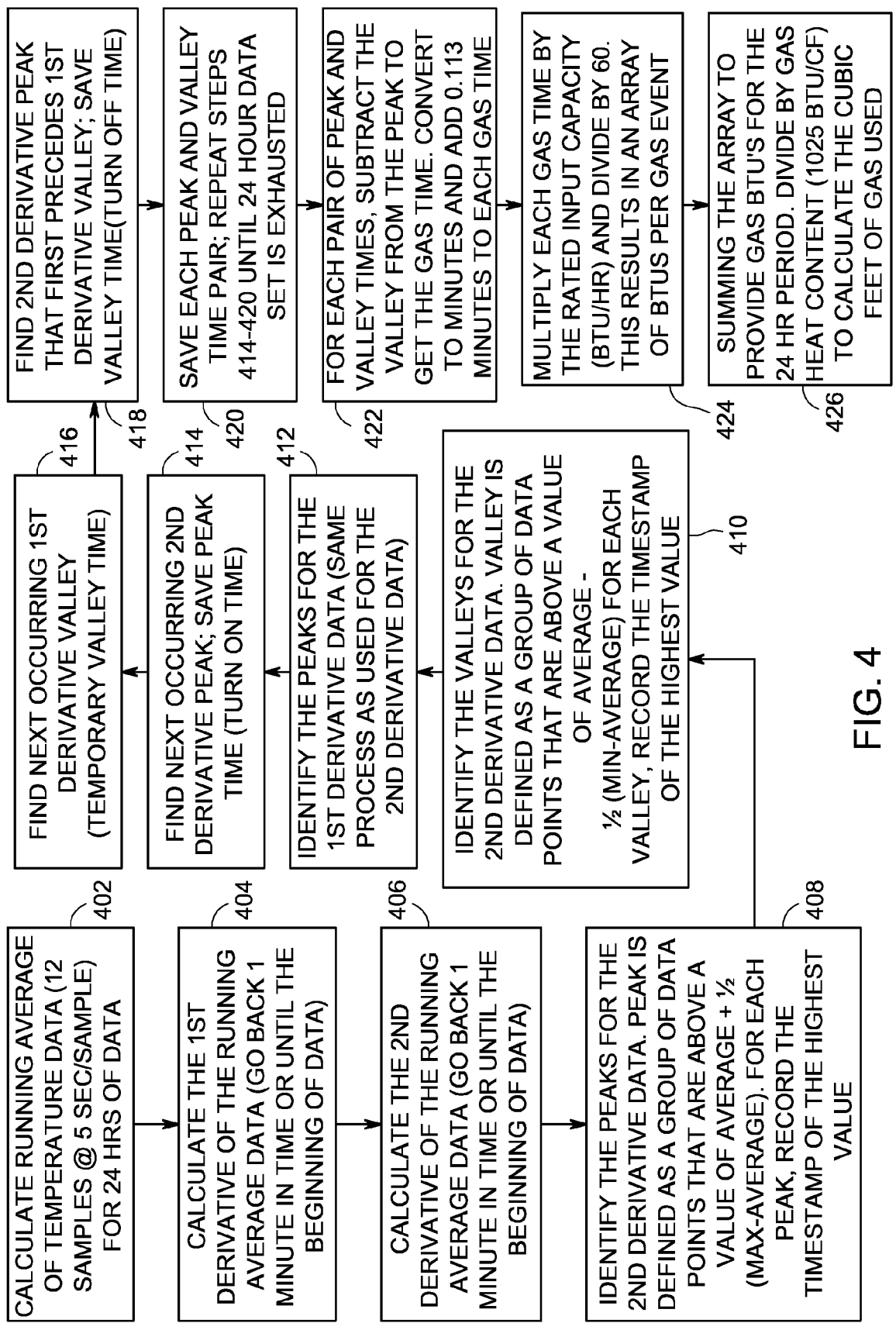
FIG. 4 presents a flow chart of a method for determining gas usage in accordance with a non-limiting exemplary embodiment of the invention.

As noted above, in the illustrative embodiments herein described, the temperature versus time profile for the burner derived from temperature data collected using sensor 72 is used to determine the burner on time. FIG. 4 presents a data flow diagram for a process implemented in processor 74 (FIG. 2) or 92 (FIG. 3) to process the collected burner related temperature versus time data to estimate burner on time and gas usage in a gas burning device. In this embodiment, data is collected via sensor 72 for successive 24 hour periods beginning at 12:00 am. The data for each 24 hour period is then processed to identify turn on and turn off events that occurred during the 24 hour period, determine the time lapse between successive turn on and turn off events, that is, the duration of each on period for the burner, that occurred during that 24 hour period and finally to calculate from that information, the amount of gas consumed during that 24 hour period. The embodiments herein described are configured to collect, process and display data for a time period of 24 hours. Other time periods could be similarly employed.

The peaks and valleys of the second derivative of the temperature versus time data provide reasonably accurate markers of the burner turn on and turn off events, respectively. However, the valleys may also be prone to a valley occurring between the peak marking the turn on event and the valley marking the burner turn off event as the rate of increase in the temperature slows down. The peaks and valleys of the first derivative data also mark the burner turn on and turn off events, but with less precision than the second derivative data. However, the first derivative data is not prone to any intermediate valleys. In the embodiment of the process herein described, the valleys of the first derivative data are used in combination with the second derivative valley data to avoid the false second derivative valleys. More particularly, the first derivative valleys are used to approximately mark the turn off events, then the second derivative valley first preceding in time each first derivative valley is identified and the time of that second derivative valley is used as the end time, that is, the time of the turn off event.

In FIG. 4, Step 402 includes calculating a running average of temperature data (for example, 12 samples at five seconds per sample for 24 hours of data). Step 404 includes calculating the first derivative of the running average data (wherein derivative equals the slope of the data). For this step, the calculation can include going back one minute in time or until the beginning of data. To calculate the first derivative, consider points in the data that are a determined time or distance apart (for example, one minute apart) and calculate the slope (rise over run) of those two points. Step 406 includes calculating the second derivative of the running average data. For this step, the calculation can also include going back one minute in time or until the beginning of data. To calculate the second derivative, a similar technique is used as with the first derivative data; that is, the slope (rise over run) is calculated points in the first derivative data that are a determined time or distance apart (for example, one minute apart).

Step 408 includes identifying the peaks for the second derivative data. A peak is defined as a group of data points (for example, a group of twenty consecutive points of data) that is above a peak threshold value. The peak threshold value is established using the maximum value (Max.) and the average value (Average) of the referenced group of data points, which in this embodiment is 24 hours of data. These values are used to establish a threshold value for identifying peaks in the data using the equation: Peak Threshold=Average+½(Max−Average). For each peak, the timestamp is recorded for the highest value in each group of data that exceeds the Peak Threshold. Step 410 includes identifying the valleys for the second derivative data. A valley is defined as a group of data points (for example, a group of twenty consecutive points of data) that is below a valley threshold value. The valley threshold value is similarly determined from the data set (for example 24 hours of data) using the equation: Valley Threshold=Average−½(Min−Average), where Min is the lowest data point in the referenced group of data points. For each valley, the timestamp is recorded for the lowest value in each group of data that is less than the Valley Threshold. Step 412 includes identifying the peaks for the first derivative data (for example, via the same process as used for the second derivative data). As the peak and valley data is being processed, it is processed in time order (for example, from midnight to midnight, or 0:00 hours to 23:59 hours). Step 414 includes, starting at time zero, determining the time of the next occurring second derivative peak, which marks the time of a turn on event, that is, the beginning of a burner on period.

Step 416 includes determining the time of the next occurring first derivative valley to provide a temporary valley time. Step 418 includes determining the time of the $2^{nd}$ derivative valley that immediately precedes in time, the first derivative valley identified in Step 416. The time of this second derivative valley marks the time of a turn off event, corresponding to the end of the burner on period. Step 420 includes storing the peak and valley times in respective arrays and returning to Step 414 to repeat Steps 414-420 until the entire 24 hour data set has been processed.

Step 422 includes, for each pair of peak and valley times, subtracting the valley time from the peak time to obtain the gas usage time. This value can be converted to minutes. Further, in one aspect of the invention, 0.113 minutes can be added to each gas usage time. The factor of 0.113 was arrived at through empirical calculation on test data. This is a function of the temperature sensing device location and thermal mass. It can be viewed as a correction factor that would be empirically determined for the location of the temperature sensing device on a particular style of gas-using appliance. Step 424 includes multiplying each gas usage time by the rated input capacity of the burner (BTU/hr) and dividing the resulting value by 60, which results in an array of BTUs per gas usage event. Step 426 includes summing this array to provide gas BTUs for the time period (for example, the 24 hour time period noted in this example). This value is then divided by the gas heat content (for example, 1025 BTU/CF) to calculate the cubic feet of gas used.

Figure 5:
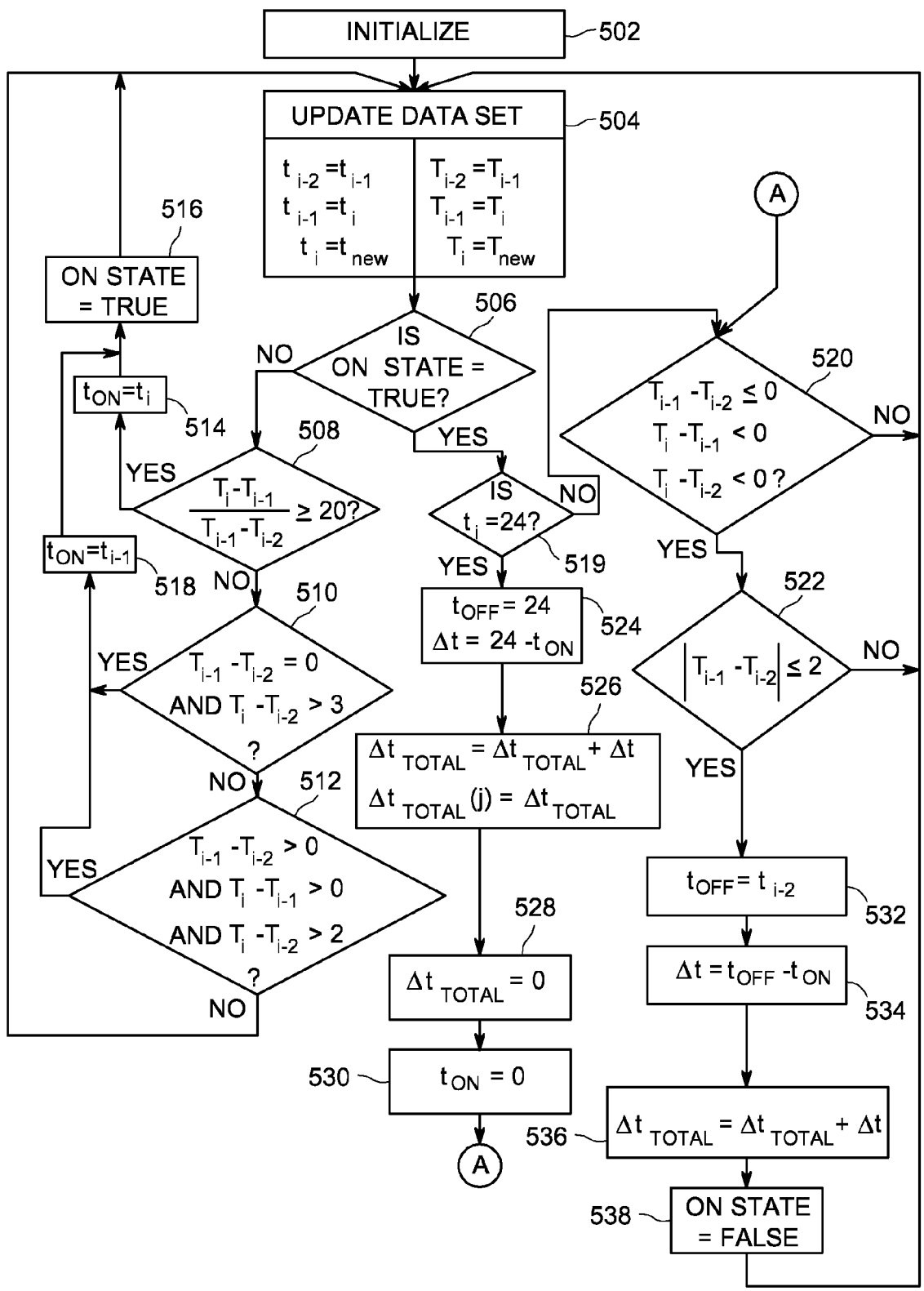
FIG. 5 presents a flow chart of an alternative method for determining gas usage, in accordance with a non-limiting exemplary embodiment of the invention

FIG. 5 presents a flow diagram for an alternative process that uses the temperature time data to estimate gas usage in a gas burning device, which could be similarly employed in the embodiments of FIGS. 2 and 3. This process is particularly accurate in detecting the time of turn on events, but a bit less accurate than the embodiment of FIG. 4 in detecting the times of turn off events. However, it has the advantage of requiring less processing time and resources than the mathematical model of FIG. 4. Step 502 is executed when the heating system is initially turned on, such as at installation of the system, or on restoration of power following a power outage, etc. The On State flag is set to equal False, signifying the burner has not yet turned on. The algorithm is configured to sample the time of day (using a 24 hour clock and sample the temperature sensor to collect a pair of data points, comprising a time t, and a temperature T every 5 seconds. The turn on and turn off detection process uses the three most recent data pairs. The most recent pair is designated $(t_i, T_i)$ the next preceding pair is $(t_{i-1}, T_{i-1})$ and the oldest pair is designated $(t_{i-2},$ $T_{i-2}$). As part of the initialization step, the first ten seconds are used to populate the three set data structure before cycling through the rest of the algorithm. At time t=0, the first data pair ($t_{new}$,$T_{new}$) is collected and the data set is updated by setting $t_i$=$t_{new}$ and Ti=$T_{new}$. Five seconds later the second data set is collected and the data set is updated by setting $t_{i-1}$ equal to the old $t_i$ and setting $t_i$=$t_{new}$. Five seconds later the third data set is collected and the data set is updated by setting $t_{i-2}$ equal to the old $t_{i-1}$, setting $t_{i-1}$ equal to the old $t_i$ and setting $t_i$=$t_{new}$. On collecting each subsequent data pair, data set is updated at step 504, eliminating the oldest pair and adding the new pair (that is, each new data entry becomes a new $t_i$ and $T_i$, respectively, the previous $t_i$ and $T_i$, become the new $t_{i-1}$ and $T_{i-1}$, and the previous $t_{i-1}$ and $T_{i-1}$, become the new $t_{i-2}$ and $T_{i-2}$).

Following the updating of the data set, Inquiry 506 checks the ON State of the burner. The ON State is a flag which is set to True when a turn on event is detected and set to False when a turn off event is detected. As above described, during the initialization phase the ON State is set to False and it will remain False until a turn on event is detected. So, on the first pass through the algorithm, the process will be directed to the path comprising decision blocks 508, 510 and 512. Each of these decision blocks represents a condition or set of conditions that are evaluated to detect a turn on event. If any one of these sets of conditions is satisfied, a turn on event is indicated. Decision block 508 evaluates the condition $$\frac{T_i - T_{i-1}}{T_{i-1} - T_{i-2}} \geq 20.$$

This condition is particularly effective to identify turn on events for burner systems such as furnaces and high efficiency water heaters. In such systems, the change in temperature when the burner is turned on can be so quick that a ratio of the slopes will serve to detect the turn on event. Because a steady sampling rate is being used, even though the conditions are expressed in temperature terms, slope changes are implicit in the calculations. In general terms, because raw data is being used to perform this procedure, some ripple and therefore oscillation may be encountered in the calculation of slopes. In the embodiment depicted in FIG. 5, the condition requires that temperature be rising fast enough that ratio of the difference between the latest sample and the prior value to difference between the prior value and the next prior value be 20 or greater to avoid a false trigger. Values other than 20 could be similarly employed and for optimum performance, should be empirically determined for the particular system design. Turning again to decision block 508, if this threshold is exceeded, the burner will be considered as having been turned on. So, when the condition at 508 is satisfied, $t_{on}$ is set equal to $t_i$ at step 514, signifying that a turn on event occurred at time $t_i$, the ON State flag is set to True at step 516 and the process returns to step 504 to collect the next data pair.

This ratio comparison works well in systems like furnaces and high efficiency water heaters because of the rapid change in slopes that occurs in such systems. However, this ratio approach is less effective in less efficient systems like standard water heaters because in such a short time frame (15 seconds for 3 data points) the ratio difference may not be high enough to be distinguishable from the raw data ripple effects. So the algorithm includes additional conditions for detecting turn on events in less efficient systems. These conditions are evaluated in decision blocks 510 and 512. If the condition of decision block 508 is not satisfied, decision blocks 510 and 512 evaluate other sets of conditions which if satisfied indicate a turn on event. These conditions also look at changes in slope of the temperature data, but are more effective for standard water heaters. Decision block 510 evaluates the set of conditions $$T_{i-1} - T_{i-2} = 0$$

$$T_i - T_{i-2} > 3.$$

The condition $T_{i-1}-T_{i-2}$=0 indicates that the slope is zero between those two points. If a progression goes from a flat slope state into a rising slope state, it needs to be verified that the device is indeed on. Here, again, there can be a ripple of the raw data. Satisfaction of the condition $T_i-T_{i-2}$>3 is required in this embodiment to reduce sensitivity to false triggers. The value "3" in step 510 represents a change in slope of approximately 17 degrees from the horizontal axis (a tan(3/10)=16.7). The value 3 is selected for the embodiment of FIG. 5, but other values could be similarly employed.

When the conditions evaluated in decision block 510 are satisfied, the time $t_{i-1}$ for the three point data set that initially satisfies the condition becomes the turn on time, $t_{on}$, as noted in step 518, where, $t_{on}$=$t_{i-1}$. If the conditions evaluated at decision block 510 are not satisfied, Decision block 512, evaluates the conditions $$T_{i-1} - T_{i-2} > 0$$

$$T_i - T_{i-1} > 0$$

$$T_i - T_{i-2} > 0.$$

In this case, the threshold does not need to be as high. It is easier to reliably detect a turn on event if there is a rising slope from point i−2 to point i−1 and from point i−1 to point i. Using the same concept described in connection with block 508, the threshold value "2" represents a change in slope of approximately 6 degrees from the horizontal axis (a tan(1/10)=5.7). When the aforementioned associated point to point slope conditions are satisfied, a rise of approximately 6 degrees is sufficient to avoid a false trigger.

When a three point data set initially satisfies the conditions of decision block 512, $t_{on}$ is set equal to $t_{i-1}$, as noted at step 518. When a turn on event is detected as a result of satisfying conditions 510 or 512, the on time, $t_{on}$, is set to $t_{i-1}$ rather than $t_i$ to account for the time lag associated with use of these conditions to detect the turn on event.

As was the case with decision block 508, if either conditions 510 or 512 are satisfied, a turn on event is detected and the ON State is set to True at Step 516 and the process returns to step 504 to update the data set. If none of the conditions of decision blocks 508, 510 or 512 are satisfied, the ON State remains False and the process returns to Step 504. Decision block 506 will continue to direct the process to decision block 508 path as long as the ON State flag remains false; that is, until a turn on event is identified. When the ON State flag is True, decision block 506 directs the process to the path comprising decision blocks 519, 520, and 522 to detect the next turn off event. The algorithm (depicted in the example embodiment in FIG. 5) identifies turn on and turn off events throughout the day (24 hour period). If the day ends while the device was on, from the time $t_{on}$ until hour 24 will be included in that day while a new loop will be started for the next day. Decision block 519 determines if the 24 hour period times out during a burner on period in order to facilitate the transition of data collection and processing from the expiring 24 hour period to the new 24 hour period. If $t_i$ equals 24, $t_{off}$ is set to 24, and the final Δt, that is, the duration of the final on period, for the ending 24 hour period is calculated as 24−$t_{on}$ (Step 524), This value of Δt is added to the cumulate Total Δt for the expiring 24 hour period to finalize the total on time for that 24 hour period (Step 526). The Total Δt variable for the new 24 hour period is set to zero (Step 528), $t_{on}$ is set to zero hours, (Step 530) and the process proceeds to decision Block 520 to evaluate conditions to detect a turn off event. Referring again briefly to decision block 519, if the 24 hour clock has not timed out, the process simply continues to decision block 520.

Decision block 520 looks for slope changes in the data set indicative of a turn off event. In particular, block 520 looks for satisfaction of the following conditions:

$$T_{i-1} - T_{i-2} \leq 0$$

$$T_i - T_{i-1} < 0$$

$$T_i - T_{i-2} < 2.$$

To satisfy these conditions, the slope needs to be either starting at negative followed by another negative slope, or starting from a slope=0 dropping to a negative slope. If these conditions are met, decision block 522 looks for satisfaction of the following condition: $|T_{i-1}-T_{i-2}| \leq 2$. This condition requires a temperature drop threshold of two degrees, which is considered a significant drop in slope magnitude. If conditions of decision block 520 and 522 are both satisfied, a turn off event is signified as having occurred at $t_{i-2}$ and Step 532 sets $t_{off}=t_{i-2}$. Having detected a turn off event, Δt is calculated (Step 534), where Δt=$t_{off}-t_{on}$. Total Δt is incremented or increased by the amount Δt (Step 536), The ON State flag is set to False (Step 538), and the process returns to Step 504 to update the data set and continue.

In the embodiment of FIG. 5, the following equations are used in reaching the final calculation:

$$\Delta t = t_{off} - t_{on} \text{ (computed for each pair of}$$

turn on and turn off events per 24 hour period)

$$t_{consumed} = \text{Total } \Delta t = \text{(the summation of the } \Delta ts \text{ for the 24 hour period)}$$

$$BTU_{day} = \sum \left( t_{consumed} * \frac{\text{Burning Rating Capacity}}{\text{hours} * 60} \right)$$

$$\text{ft}^3 \text{ of gas} = \frac{BTU_{day}}{\text{Natural Gas Heating Value}}$$

In connection with the above equations, Δt is the number of minutes between detected turn on and turn off events, estimating the time that the gas burner was actually on. Also, the Natural Gas Heating Value can be input as a specific value by the user (or utility) or a default of 1025 Btu/Ft³ can be used.

In accordance with an aspect of the present invention, the amount of gas consumed over a specific timeframe, is used to determine the amount of hot water used as follows: Volume of Hot water used=(Total energy used by the burner over specific timeframe−energy required to maintain the water in the tank at setpoint temperature minus an estimation of the portion of the pilot light energy that is deemed to escape up the flue stack)/heat content of the natural gas (in BTU/cubic feet, for example).

As noted herein, assumptions can be made about the given water heater such as the flow-rate of the fixed-orifice burner, pilot light energy lost up the stack, hysteresis of the control around the set-point, the BTU/hr rating of the burner, the efficiency of the burner, the wall thickness of the insulation along with the associated k-factor, and the heat content of the natural gas to make these calculations. In many cases, the homeowner can obtain these inputs from the water heater manufacturer or from the energy label to improve the accuracy of the calculations. If such inputs are not provided, one or more embodiments of the invention can include inputting estimated values based on the age of the water heater, type of water heater (for example, power vent versus non-power vent), etc.

As described above with reference to FIGS. 2 and 3, an illustrative embodiment of a system with the capability to estimate hot water usage for a gas water heater includes a sensor unit or module that incorporates, three transducers: one transducer measuring a burner related temperature to detect turn on and turn off events for the burner to determine burner on times as described above, a second transducer to measure the incoming water temperature, and a third transducer to measure the output water temperature. In accordance with the present invention, the latter two transducers collect temperature data used to estimate the amount of hot water withdrawn from the water heater tank during a given time frame, e.g., a 24 hour period.

Figure 6:
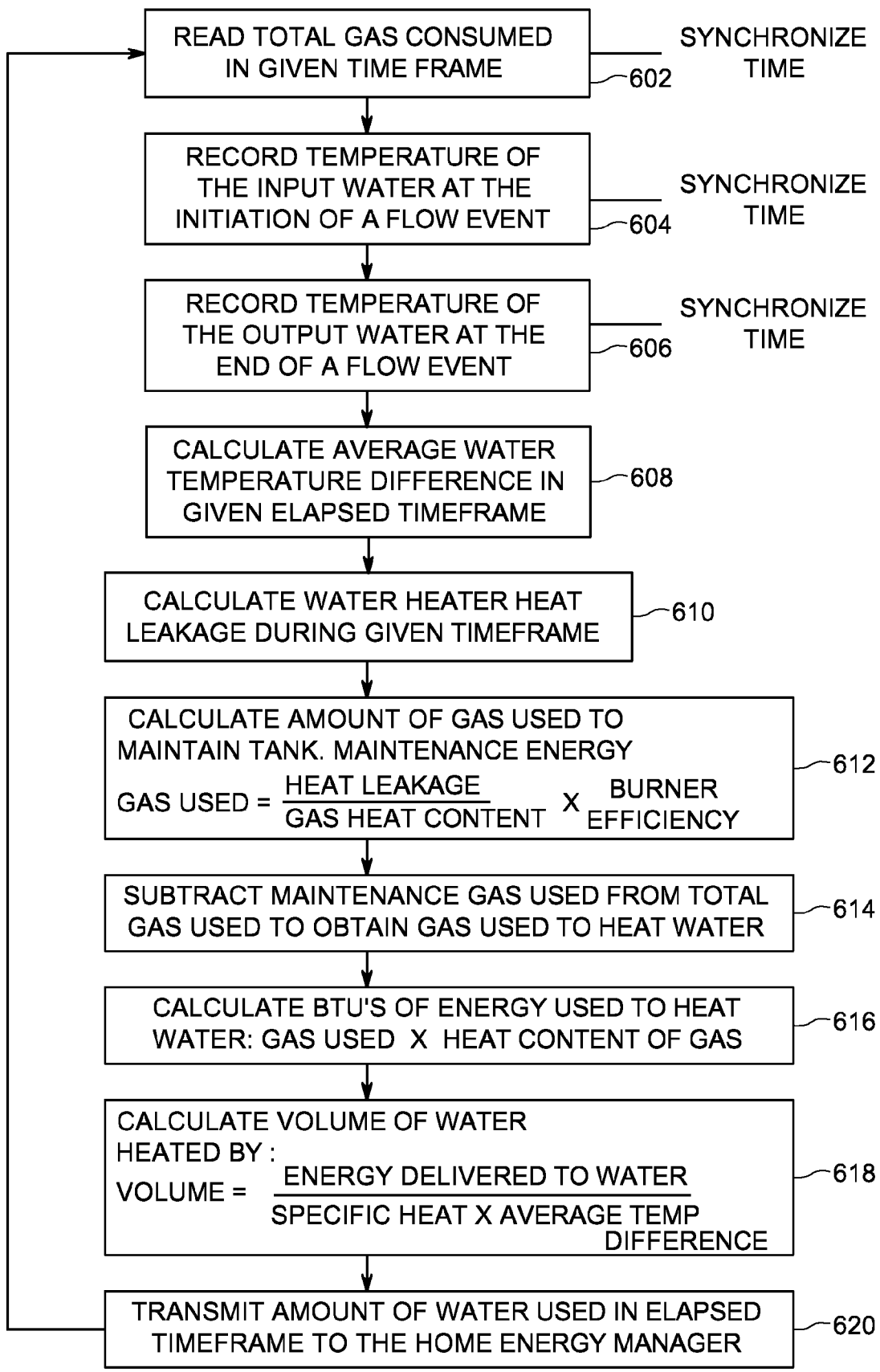
FIG. 6 is a flow chart of a method for estimating hot water usage, in accordance with a non-limiting exemplary embodiment of the invention.

FIG. 6 is a flow chart of a process used by processer 74 (FIG. 2) or 92 (FIG. 3) for processing the water temperature data collected by transducers 212 and 214 (FIG. 2) or 308 and 310 (FIG. 3) to estimate hot water usage, in accordance with a non-limiting exemplary embodiment of the invention. As above described in connection with the process for determining the volume of gas consumed, temperature data is collected via the water inlet and outlet temperature sensors for successive 24 hour periods beginning at 12:00 am. The water temperature data for each 24 hour period is then processed to identify the water dispense events that occurred during the 24 hour period, determine the average temperature difference between the incoming and outgoing water temperatures during the dispense events that occurred during that 24 hour period and finally to use that information, together with the volume of gas used by the burner during that same time period, to estimate the volume of hot water dispensed from the hot water heater during that 24 hour period. While embodiments herein described are configured to collect, process and display data for a time period of 24 hours. Other time periods could be similarly employed.

Step 602 includes reading the total gas consumed in a given timeframe. Step 604 includes detecting the initiation of a flow event and recording the temperature of the input water at that point in time. Step 606 includes detecting the end of a flow event and recording the temperature of the output water at that point in time. Step 608 includes calculating an average water temperature difference in given elapsed timeframe by detecting the beginning and end of each flow or dispense events and calculating the average water temperature as is further described below in connection with FIG. 8A and FIG. 8B.

Step 610 includes calculating water heater heat leakage during the given timeframe. A process for Step 610 is further described hereinafter with reference to FIGS. 7A and 7B. Step 612 includes calculating the amount of gas used to replace the heat lost by heat leakage to maintain tank at setpoint (maintenance energy) via: Gas Used=(Heat Leakage/Gas Heat Content)×Burner efficiency (that is, the efficiency of the burner in converting the burned energy to actually heating water). Gas heat content is a term defining the number of BTUs of energy available per cubic foot for the gas fuel. In Step 614, the amount of gas used to heat the water drawn into the tank to replace the water withdrawn from the tank to the setpoint temperature is calculated by subtracting maintenance gas used (from Step 612) from total gas used (the latter having been determined in the illustrative embodiments as described with reference to FIGS. 4 and 5). Step 616 includes calculating BTUs of energy used to heat the added water using the equation: Volume of Gas Used to Heat Added Water×Heat Content of Gas.

In Step 618, the volume of water heated during the 24 hour time period is calculated using the equation: Volume=Energy Delivered to Water (from Step 616)/(Specific Heat×Average Temperature Difference (from Step 608)). Specific heat is a property of the water that relates to the amount of heat required to raise one pound mass of water by one degree Fahrenheit. Step 620 includes transmitting the amount/volume of water used in the elapsed timeframe to a home energy manager.

Figure 7A:
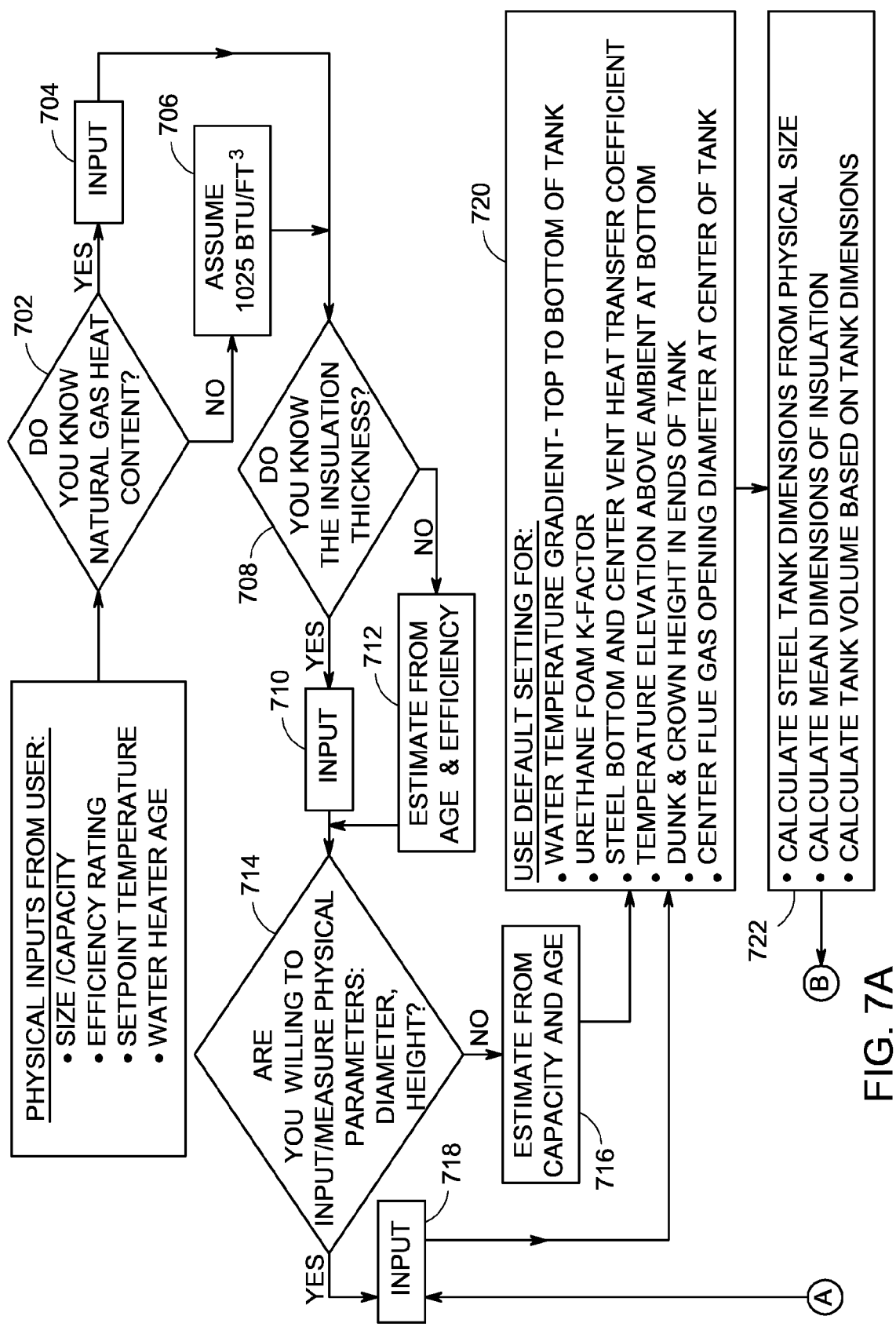
FIGS. 7A and 7B together show a flow chart of a method for estimating maintenance energy of a hot water heater, in accordance with a non-limiting exemplary embodiment of the invention.
Figure 7B:
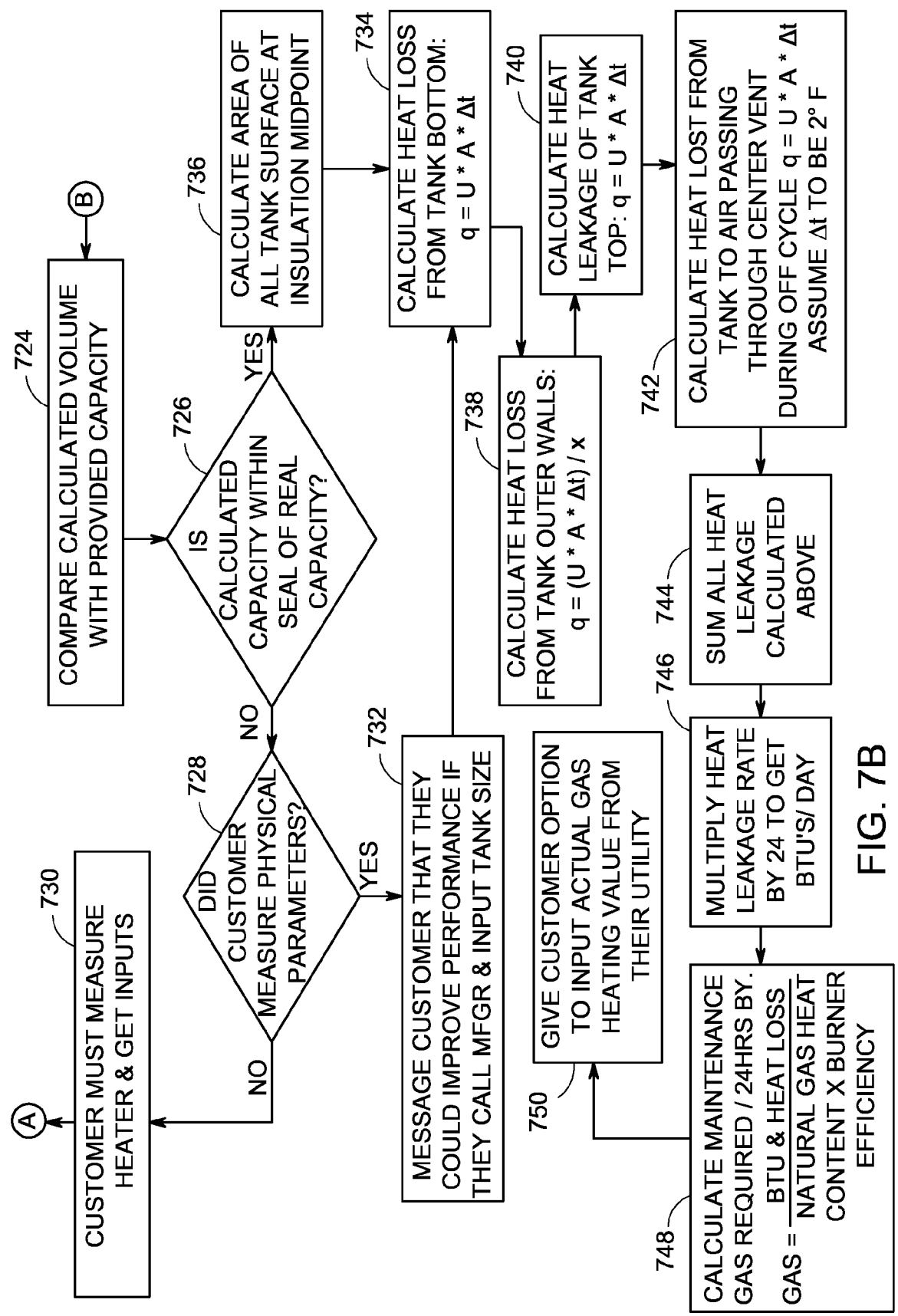

FIGS. 7A and 7B together show a flow chart of a method for estimating the maintenance energy consumed by a hot water heater which method is used in Step 610 of FIG. 6, in accordance with a non-limiting exemplary embodiment of the invention. In connection with the techniques depicted in FIGS. 7A and 7B, a user can provide physical inputs including size or capacity of the water heater, an efficiency rating for the water heater, a setpoint temperature and the age of the water heater.

Accordingly, step 702 includes ascertaining if the natural gas heat content is known. If yes, then step 704 includes inputting that information into the system. If no, then step 706 includes inputting an assumed value (for example, 1025 BTU/ft$^3$). Step 708 includes ascertaining if the insulation thickness of the water heater is known. If yes, then step 710 includes inputting that information into the system. If no, then step 712 includes inputting an assumed value based on age and efficiency of the water heater. Also, step 714 includes ascertaining if physical parameters of the water heater (for example, diameter and height) are known. If yes, then step 718 includes inputting that information into the system. If no, then step 716 includes inputting estimated value(s) based on capacity and age of the water heater.

Step 720 includes using default setting values for water temperature gradient (top to bottom of the tank), urethane foam K factor, steel bottom and center vent heat transfer coefficient, temperature elevation above the room ambient at the bottom burner area of the water heater, dunk and crown height in ends of the tank, as well as center flue gas opening diameter at center of the tank. Step 722 includes making calculations that include: calculating steel tank dimensions from physical size values, calculating mean dimensions of the insulation, and calculating tank volume based on tank dimensions. Step 724 includes comparing the calculated volume with the provided capacity. Step 726 includes ascertaining whether the calculated capacity is within five gallons of the provided capacity. If yes, then step 736 includes calculating the area of all tank surfaces at insulation midpoint. If no, then step 728 includes ascertaining whether the customer/user measured the physical parameters. If the user did not measure the parameters, step 730 includes querying the user to make the measurements and obtain the necessary inputs. If the user did measure the parameters, then step 732 includes messaging the user that performance could be improved if manufacturer supplied tank dimensions and parameters were used as an input.

Step 734 includes calculating heat loss from the tank bottom via: $q=U*A*\Delta t$, wherein the A refers to the surface area through which the heat is being transferred and U is the overall heat transfer coefficient for a cylindrical mild steel tank with steel bottom typically on the order of 2.0 btu/ft squared-hour degrees F. and $\Delta t$ is the difference between the temperature at the inner surface of the wall and the temperature at the outer surface of the wall. Step 738 includes calculating heat loss from the tank outer walls via: $q=(k*A*\Delta t)/x$ where A is again the surface area, k is the thermal conductivity of the insulating material, which for polyurethane foam is on the order of 0.12 btu/hr-square ft-degree f/inch thickness and "x" is the thickness of the insulating material. This is a simple one-dimensional conduction heat transfer equation. Step 740 includes calculating heat loss from the top of the tank via: $q=U*A*\Delta t$. Step 742 includes calculating heat loss from the tank to air passing through the center vent during an off cycle via: $q=U*A*\Delta t$. For Steps 738 and 740, the inner side temperature may be satisfactorily approximated using the setpoint temperature and the outer side temperature may be satisfactorily approximated using the ambient temperature. For the calculation of loss through the wall around the center vent, (Step 742), for the illustrative embodiment the $\Delta t$ is assumed to be two degrees Fahrenheit; however, this value can be changed in the algorithm based on empirical testing for particular water heater models. Step 744 includes summing all heat leakages calculated in the above steps. Step 746 includes multiplying a heat leakage rate by 24 to obtain BTUs per day.

Further, step 748 includes calculating the maintenance gas required per 24 hours via: Gas=(BTUs Heat Loss)/(Natural Gas Heat Content×Burner Efficiency). Step 750 includes providing the customer/user an option to input actual natural gas heat content value(s) from the utility providing the gas.

Figure 8A:
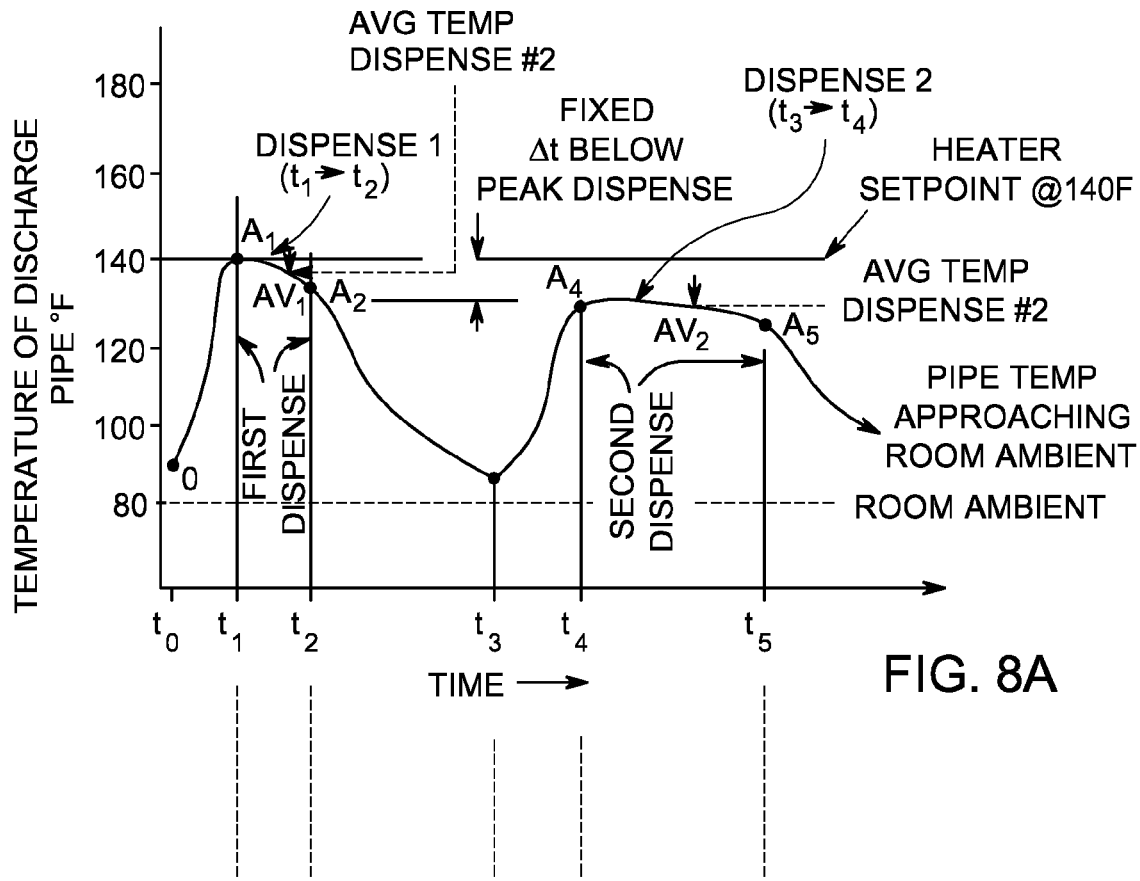
FIG. 8A is a graph illustrating example water heater discharge pipe temperature during dispense, in accordance with a non-limiting exemplary embodiment of the invention.
Figure 8B:
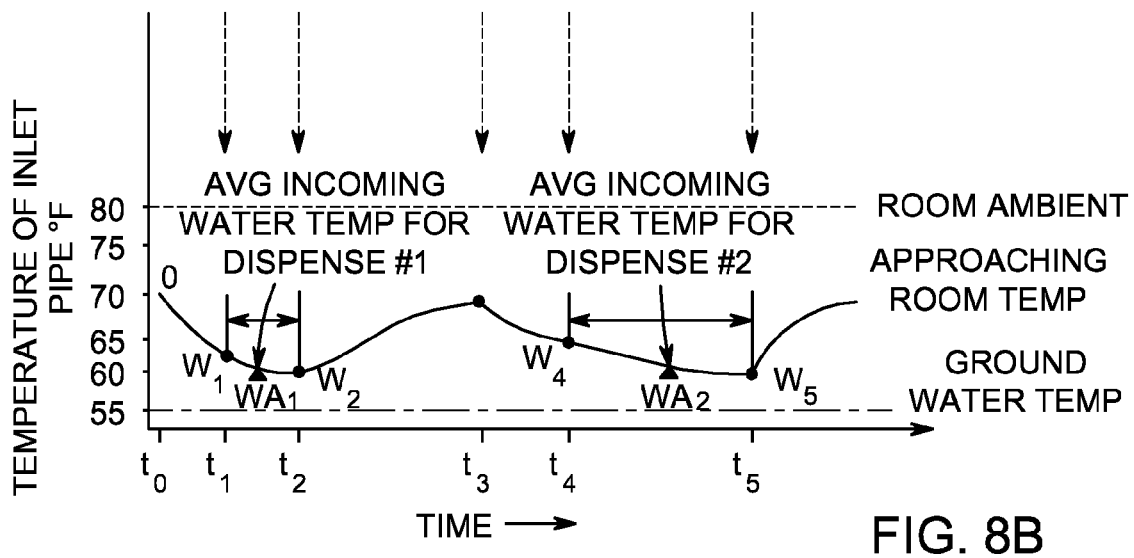
FIG. 8B is a graph illustrating example water heater inlet pipe temperature during dispense, in accordance with a non-limiting exemplary embodiment of the invention.

FIG. 8A shows a typical temperature profile from monitoring the outlet pipe during two dispense/refill events as hot water is dispensed and replaced and FIG. 8B shows the inlet pipe temperature profile during the same to dispense/refill events. Point 0 in FIG. 8A coincides with the pipe temperature prior to the initial dispense event. Point $t_1$ is the time of the start of the first dispense event shown. As shown, the temperature of the outlet pipe increases rapidly as hot water from the tank enters the pipe. This rapid increase can be readily determined by a processing technique that uses the first and second derivatives of the temperature time data, such as described hereinbefore with reference to FIGS. 4 and 5 for detecting on and off events for the water heater. In this case, one might simply define a specific predetermined threshold slope to identify the point $A_1$ because the curve will rise rapidly from point 0 to point $A_1$ due to hot water flowing. Similarly, point $A_2$ will be identified by specifying a second specific predetermined slope (in the down direction/negative slope). When $A_1$ and $A_2$ are identified, the associated temperature time data, $(T_1, t1)$ and $(T_2, t2)$ are used to calculate the average dispense temperature is calculated and stored. More specifically, the Average Dispense temperature is calculated by $(T_1-T_2)/2$ and the duration of the associated dispense event is calculated $(t_2-t_1)$ and the values are stored as paired data for use in a subsequent calculation. This process is repeated for each dispense event identified in the 24 hour period of interest, then the average dispense temperatures calculated by this process are averaged over the 24 hour period to obtain the overall average dispense temperature for the 24 hour period. While the average thus calculated without regard the duration of the dispense events, can be used to approximate the total volume of water dispensed, a more accurate estimate can be calculated using the time duration data to calculate a time weighted average. The time-weighted average is calculated using the following algorithm:

$$\frac{A_{v1} * \Delta \text{time } dispense_1 + A_{v2} * \Delta \text{time } dispense_2 + \ldots}{\text{TOTAL TIME DISPENSED}}.$$

This would help account for the disproportionate influence of dispense events of significantly different duration, e.g., a long shower, versus filling a sink to wash dishes.

Having calculated the average dispensed water temperature, it remains to determine the average incoming water temperature. Referencing FIG. 8B, a similar process can be used to calculate the average incoming water temperature during a dispense event. Point 0 in FIG. 8B coincides with point 0 in FIG. 8A relative to time. Likewise, all other points in FIG. 8B coincide in time with the similarly numbered point in FIG. 8A. Using the outlet temperature start and stop times determined by processing the outlet water temperature as described with reference to FIG. 8A, a calculation can now be made as to the average incoming water temperature for the given timeframe (for example, 24 hours) for the inlet water temperature data in the same manner just described for the outlet water temperature.

The difference between the overall average inlet temperature and the overall average outlet water temperature is used in Step 618 of FIG. 6 to calculate the volume of water heated during the 24 hour period which corresponds to the volume of water dispensed from the water heater during this period.

By way of example, code for the algorithms detailed herein can be embodied on a chip. Additionally, a sensor module (as described herein) can be independently implemented in a home energy management system. In one or more embodiments of the invention, the module includes a microprocessor containing the software for carrying out the techniques detailed herein, and the module would be capable of sending gas usage/water usage data up to the home energy manager by way of a radio. In another aspect of the invention, the module can send the temperature data in a stream (with a time stamp) to the home energy manager on a continuous basis, and then the home energy manager takes the data and performs the calculations of gas usage and water usage. The module can also have a power supply or a battery (including the ability to send information about the voltage to the home energy manager to provide an alert when the battery needs to be replaced).

An aspect of the invention can additionally include performing an accuracy check of a water volume calculation. An accuracy check can include identifying a meter reading in connection with a hot water heater at a beginning of a specific timeframe, identifying a meter reading at an end of the specific timeframe before dispensing any water, and cross-checking data from the meter readings against the water volume calculation to determine a percent error. Further, a home energy management system might provide suggestions for improving accuracy based on results of the accuracy check (for example, re-measurement of one or more variables).

One advantage that may be realized in the practice of some embodiments of the described systems and techniques is the ability to estimate hot water usage in a gas water heater without needing a water flow meter.

Figure 9:
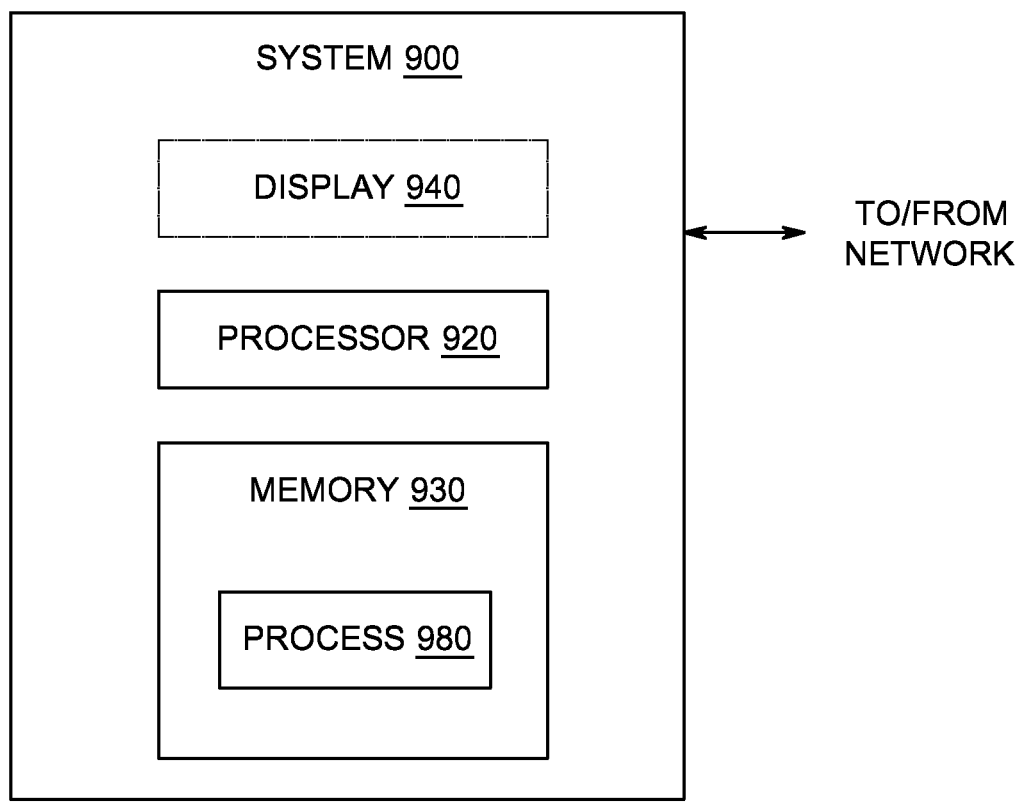
FIG. 9 is a block diagram of an exemplary computer system useful in connection with one or more embodiments of the invention.

Aspects of the invention can employ hardware and/or hardware and software aspects. Software includes but is not limited to firmware, resident software, microcode, etc. FIG. 9 is a block diagram of a system 900 that can implement part or all of one or more aspects or processes of the invention. As shown in FIG. 9, memory 930 configures the processor 920 to implement one or more aspects of the methods, steps, and functions disclosed herein (collectively, shown as process 980 in FIG. 9). Different method steps could theoretically be performed by different processors. The memory 930 could be distributed or local and the processor 920 could be distributed or singular. The memory 930 could be implemented as an electrical, magnetic or optical memory, or any combination of these or other types of storage devices. It should be noted that if distributed processors are employed (for example, in a design process), each distributed processor that makes up processor 920 generally contains its own addressable memory space. It should also be noted that some or all of computer system 900 can be incorporated into an application-specific or general-use integrated circuit. For example, one or more method steps (for example, as described herein) could be implemented in hardware in an application-specific integrated circuit (ASIC) rather than using firmware. Display 940 is representative of a variety of possible input/output devices.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a processor or other computer system, to carry out all or some of the steps to perform the methods or create the apparatuses discussed herein. A computer-usable medium may, in general, be a recordable medium (for example, floppy disks, hard drives, compact disks, EEPROMs, or memory cards) or may be a transmission medium (for example, a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). As used herein, a tangible computer-readable recordable storage medium is intended to encompass a recordable medium, examples of which are set forth above, but is not intended to encompass a transmission medium or disembodied signal.

The computer system can contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention, such as, for example, a sensor module, can make use of computer technology with appropriate instructions to implement method steps described herein.

Accordingly, it will be appreciated that one or more embodiments of the present invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

It will be understood that processors or computers employed in some aspects may or may not include a display, keyboard, or other input/output components. In some cases, an interface is provided.

Thus, while there have shown and described and pointed out fundamental novel features of the invention as applied to exemplary embodiments thereof, it will be understood that various omissions and substitutions and changes in the form and details of the devices illustrated, and in their operation, may be made by those skilled in the art without departing from the spirit of the invention. Moreover, it is expressly intended that all combinations of those elements and/or method steps which perform substantially the same function in substantially the same way to achieve the same results are within the scope of the invention. Furthermore, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for determining the volume of hot water dispensed from a hydrocarbon-fueled hot water heater heated by a burner over a given timeframe, comprising the steps of:
   measuring water heater inlet water temperature data during a given timeframe at a first predetermined sampling rate;
   measuring water heater outlet water temperature data during the given timeframe at the first predetermined sampling rate;
   measuring burner parameter data during the given timeframe at a predetermined sampling rate;
   determining the volume of fuel consumed by the burner during the given timeframe from the burner parameter data;
   processing the inlet water temperature data and the outlet water temperature data to calculate the average inlet water temperature and the average outlet water temperature for the given timeframe; and
   calculating the volume of hot water dispensed during the given timeframe based on the volume of fuel consumed by the burner during the given timeframe and the difference between the average inlet water temperature and the average outlet water temperature;
   wherein measuring burner parameter data comprises measuring temperature data during the given timeframe, and determining the volume of fuel consumed by the burner during the given timeframe comprises:
      obtaining a temperature versus time profile for the given timeframe using the measured temperature data;
      determining first and second derivatives of the temperature versus time profile;
      identifying one or more peaks in the second derivative of the temperature versus time profile;
      identifying one or more valleys in the first derivative of the temperature versus time profile following corresponding ones of the identified one or more peaks in the second derivative of the temperature versus time profile;
      identifying, for each of the identified one or more valleys in the first derivative of the temperature versus time profile, a first valley in the second derivative of the temperature versus time profile that precedes the corresponding valley in the first derivative of the temperature versus time profile;
      wherein the one or more peaks in the second derivative of the temperature versus time profile are used as turn on times of the burner and the one or more first valleys in the second derivative of the temperature versus time are used as turn off times of the burner.

2. The method of claim 1, further comprising the steps of:
   calculating water heater heat leakage during the given timeframe based on the inlet and outlet water temperature data and multiple parameters of the hot water heater;
   calculating the volume of fuel used to heat the water in the tank of the hot water heater to replace heat lost through heat leakage to maintain the hot water heater at a set-point based on the calculated water heater heat leakage rate;
   calculating the volume of fuel used to heat water added to the tank to bring the water temperature to the set point following a fill event during the given timeframe by subtracting the amount of gas used to maintain the hot water heater at a setpoint from the total volume of fuel consumed during the timeframe; and
   using the volume of fuel used to heat water added to the tank in the step of calculating the volume of water heated during the given timeframe.

3. The method of claim 2, further comprising transmitting the calculated volume of water heated in the given timeframe to a home energy manager.

4. The method of claim 3, further comprising performing an accuracy check of the volume of water heated calculation, wherein performing an accuracy check of the volume of water heated calculation comprises:
   identifying a meter reading in connection with a hot water heater at a beginning of a specific timeframe;
   identifying a meter reading at an end of the specific timeframe before dispensing any water; and
   cross-checking data from the meter readings against the volume of water heated calculation to determine a percent error.

5. The method of claim 1, wherein the hot water heater is a residential hot water heater.

6. The method of claim 1, wherein calculating the volume of hot water dispensed does not require utilization of a water flow meter in a water supply line of the hot water heater or a water flow meter in a water dispense line of the hot water heater.

7. The method of claim 1, wherein:
   measuring water heater inlet water temperature data utilizes a first sensor attached adjacent to or near a cold water inlet pipe of the hot water heater;
   measuring water heater outlet water temperature data utilizes a second sensor attached adjacent to or near a hot water outlet pipe of the hot water heater; and
   measuring burner parameter data utilizes a third sensor configured to detect physical or chemical changes that occur during activation or deactivation of the burner.

8. The method of claim 1, wherein measuring burner parameter data comprises measuring temperature data during the given timeframe, and determining the volume of fuel consumed by the burner during the given timeframe comprises:
   obtaining a temperature versus time profile for the given timeframe using the measured temperature data;
   calculating slopes of corresponding pairs of data points in the temperature versus time profile; and identifying turn on and turn off times of the burner when the calculated slopes for a set of two or more data points exceeds a threshold value.

9. The method of claim 1, wherein processing the outlet water temperature data to calculate the average outlet water temperature for the given timeframe comprises calculating a time-weighted average outlet water temperature utilizing respective durations of dispense events for the hot water heater.

10. The method of claim 9, wherein the respective duration of dispense events for the hot water heater are determined based on temperature data obtained from a sensor attached adjacent to or near a hot water outlet pipe of the hot water heater.

11. The method of claim 10, further comprising:
obtaining a temperature versus time profile for the given timeframe using the temperature data obtained from the sensor;
determining first and second derivatives of the temperature versus time profile;
identifying one or more peaks in the second derivative of the temperature versus time profile;
identifying one or more valleys in the first derivative of the temperature versus time profile following corresponding ones of the identified one or more peaks in the second derivative of the temperature versus time profile;
identifying, for each of the identified one or more valleys in the first derivative of the temperature versus time profile, a first valley in the second derivative of the temperature versus time profile that precedes the corresponding valley in the first derivative of the temperature versus time profile;
wherein the one or more peaks in the second derivative of the temperature versus time profile are used as start times for respective dispense events and the one or more first valleys in the second derivative of the temperature versus time are used as end times for respective dispense events.

12. The method of claim 10, further comprising:
obtaining a temperature versus time profile for the given timeframe using the temperature data obtained from the sensor;
calculating slopes of corresponding pairs of data points in the temperature versus time profile; and
identifying start times and end times of respective dispense events when the calculated slopes for a set of two or more data points exceeds a threshold value.

* * * * *